United States Patent
Tsai

[11] Patent Number: 5,164,768
[45] Date of Patent: Nov. 17, 1992

[54] METHOD AND APPARATUS FOR CONVERTING A CONVENTIONAL COPIER INTO AN ELECTRONIC PRINTER

[76] Inventor: Irving Tsai, 435 East 70th St., Apt. 16K, New York, N.Y. 10021

[21] Appl. No.: 840,179

[22] Filed: Feb. 24, 1992

Related U.S. Application Data

[63] Continuation-in-part of Ser. No. 437,254, Nov. 16, 1989, Pat. No. 5,091,747.

[51] Int. Cl.⁵ .............................................. G03G 15/00
[52] U.S. Cl. .................................. 355/202; 250/208.4
[58] Field of Search ................... 355/200, 202, 40, 41; 395/101; 340/700; 250/208.4, 208.6

[56] References Cited

U.S. PATENT DOCUMENTS 4,194,833  3/1980  Lester et al. ...................... 355/202
4,714,940 12/1987  Inoue et al. ........................ 355/202

FOREIGN PATENT DOCUMENTS 63-298260 12/1988 Japan .................................. 355/202

OTHER PUBLICATIONS

*Xerox Disclosure Journal*, vol. 1, No. 5, May 1976, Koehler, R. F., "Copy Numbering Device", pp. 89-90.

Primary Examiner—Joan H. Pendergrass
Attorney, Agent, or Firm—Spensley Horn Jubas & Lubitz

[57] ABSTRACT

A "conversion" device is described that enables a conventional, dedicated copier designed for the singular purpose of making copies to be employed additionally as an electronically-driven printing apparatus, thereby offering a standard issue copier the added functionality of a computer printer or facsimile machine.

9 Claims, 6 Drawing Sheets

METHOD AND APPARATUS FOR CONVERTING A CONVENTIONAL COPIER INTO AN ELECTRONIC PRINTER

The present application is a continuation-in-part of U.S. application Ser. No. 07/437,254, filed Nov. 16, 1989, now U.S. Pat. No. 5,091,747.

BACKGROUND OF THE INVENTION

1. Field of the Invention

The present invention relates to a method and apparatus for enabling a conventional, dedicated copier to operate as an electronically driven printing apparatus, such as a laser printer or facsimile machine.

2. Description of Related Art

It is recognized that the notion of constructing dual purpose copier/printers has been contemplated by industry. Such devices generally comprise a standard copier module and a standard electronically driven printing module, combined in an appropriate fashion so that both modules reside within a single structural enclosure.

It is also recognized that liquid crystal devices have been used as optical shutters by certain manufacturers of what have commonly come to be known as "laser printers". However, such devices are still dedicated printers.

Also known to exist are copier attachments, most commonly used with color copiers, that allow 35 mm photographic slides to be projected onto a copier for reproduction. Such accessories, however, are essentially extensions of the focusing elements of the copier and do not embrace the capabilities of the present invention. Their functional objective is to permit replication of photographic representations that are graphically accurate only to transmitted (rather than reflected) light, and only after considerable magnification has been provided.

Whereas the above-described attachment is fundamentally a slide projector (from a structural perspective), it is an object of the present invention to provide an electronic image-forming apparatus that enables a standard copier to perform as a printer which is the functional equivalent of a dedicated computer printer, facsimile printer, or other type of dedicated electronically driven printer.

SUMMARY OF THE INVENTION

In accordance with the present invention, this and other objectives are achieved by providing a conversion device that enables equipment designed for the purpose of making copies to be utilized additionally as electronically driven printers.

An embodiment of the present invention includes an image forming member capable of providing a graphical image that can be detected and reproduced by a copier, means for translating electrical signals representative of an image into a perceptible rendition on the image forming member, and means for receiving such electrical signals from a remote source such as a computer, or else means to furnish such signals by directly reading from a storage medium such as a magnetic diskette, tape, or optical disc. The electrical signals that define the image may originate from a computer, or from any kind of source or electronic apparatus capable of generating, manipulating, storing, or conveying electrical signals containing graphical information.

One advantage of an embodiment of the present invention is that it offers owners of copying equipment the option of using their existing equipment as flexible, electronic printers.

Another advantage is portability. Embodiments of the present invention are reasonably portable, and so enable quality electronic printing in settings where only a computer and copier, or only a mere copier is present. This aspect is particularly convenient to individuals whose work takes them to environments where specialized printing equipment is unavailable, or where the available equipment is incompatible with their needs. As copiers tend to be more ubiquitous, the present invention makes use of them to enable a computer printout or a facsimile printout to be obtained in the total absence of such equipment.

Yet another advantage of embodiments of the present invention is that it can be used with copying equipment designed for large volume or high speed operation, as well as with those possessing elaborate paper handling capabilities such as collation and stapling. Dedicated electronic printers generally do not possess complex document handling features.

A further advantage of embodiments of the present invention arises from its modularity of design. Modularity permits a single apparatus according to the invention to emulate an array of traditionally single purpose devices. Depending on the choice of Device Emulation Module selected, it is possible to mimic equipment such as: a facsimile machine, a "Postscript" printer, a "PCL" printer, a print spooler.

With respect to computer printer emulation, one advantage arising from the modular approach is the transfer of interpretation of the "page description language" external to the actual printing hardware. For instance, printers are sometimes described as being designed for the "Macintosh Environment" or for the "PC Environment". Because the various "Environments" are not compatible, there has been a tendency for certain brands of computers to be paired with specific classes of printers constructed expressly to accommodate them. Recently, efforts have been made via software, hardware add-on cards, and in a few instances, through hardware incorporated into printers to address this matter. These efforts, however, are still somewhat limited in the scope of their accomplishments.

The benefit derived from placing the interpreter in a module completely apart and separable from the actual printing hardware is cost efficiency and expanded flexibility. Modularity permits different interpreters to operate with the same printing hardware, and thereby enables a solitary printing engine to serve an array of different computers. In the case of the present invention, the most expensive component, the actual printing hardware, does not even figure into the cost of the apparatus of the present invention —it is conveniently furnished by the copier. The user has the power to choose which copier to employ and hence has added control over the creation of output. Finally, output may be made to appear as if it originated from any of a wide assortment of printers, depending on the choice of printer chosen to be emulated.

BRIEF DESCRIPTION OF THE DRAWINGS

A detailed description of preferred embodiments of the invention will be made with reference to the accompanying drawings, wherein like numerals designate corresponding parts in the several figures.

DESCRIPTION OF THE PREFERRED EMBODIMENT

The following detailed description is of the best presently contemplated mode of carrying out the invention. This description is not to be taken in a limiting sense, but is made merely for the purpose of illustrating the general principles of the invention. The scope of the invention is best defined by the appended claims.

The general form of the invention comprises a device capable of generating an image derived from an electrical representation of an image. The device possessing the capacity to be mounted or otherwise placed in such relationship relative to a copier that said copier can reproduce the image onto a substrate such as paper.

The electrical signals defining the image may originate from a computer, magnetic storage device, optical storage device, or from any kind of source or electronic apparatus capable of generating, manipulating, storing, or conveying electrical signals representing displayable information. The internal components and the manner of operation of these devices are well known in the art and, in the interest of simplifying the present disclosure, will not be discussed in the present disclosure.

Embodiments of the invention, in a sense, can be likened to "electronic paper" since it is usually a sheet of paper, bearing an image on it, that is placed on a copier for the purpose of being duplicated. Embodiments of the present invention, however, permit images to be easily altered or manipulated as they are of electrical origin. The function of the copier is to transform the "electronic paper" image into one on "real paper", or one on other suitable substrates.

As those skilled in the art of electronic information display are aware, there are numerous means by which an image, emanating from an electrical signal representative of that image, may be fashioned. Numerous strategies embraced by that technological family may be applicable to the reduction to practice of the present invention. Examples of potential image forming systems are: liquid crystal devices, gas plasma devices, fluorescent displays, cathode ray tubes, electrophoretic displays, and filed emission displays. The particular image forming technology used to implement the invention will influence the additional components needed to enable the image forming element to function as intended; impact the resolution, contrast, and quality of the printed output; and affect the overall configuration of the apparatus. For instance, electrophoretic displays would not require back-lighting. The aforementioned considerations are appreciable to those skilled in the art.

Figures 1, 2, 7:
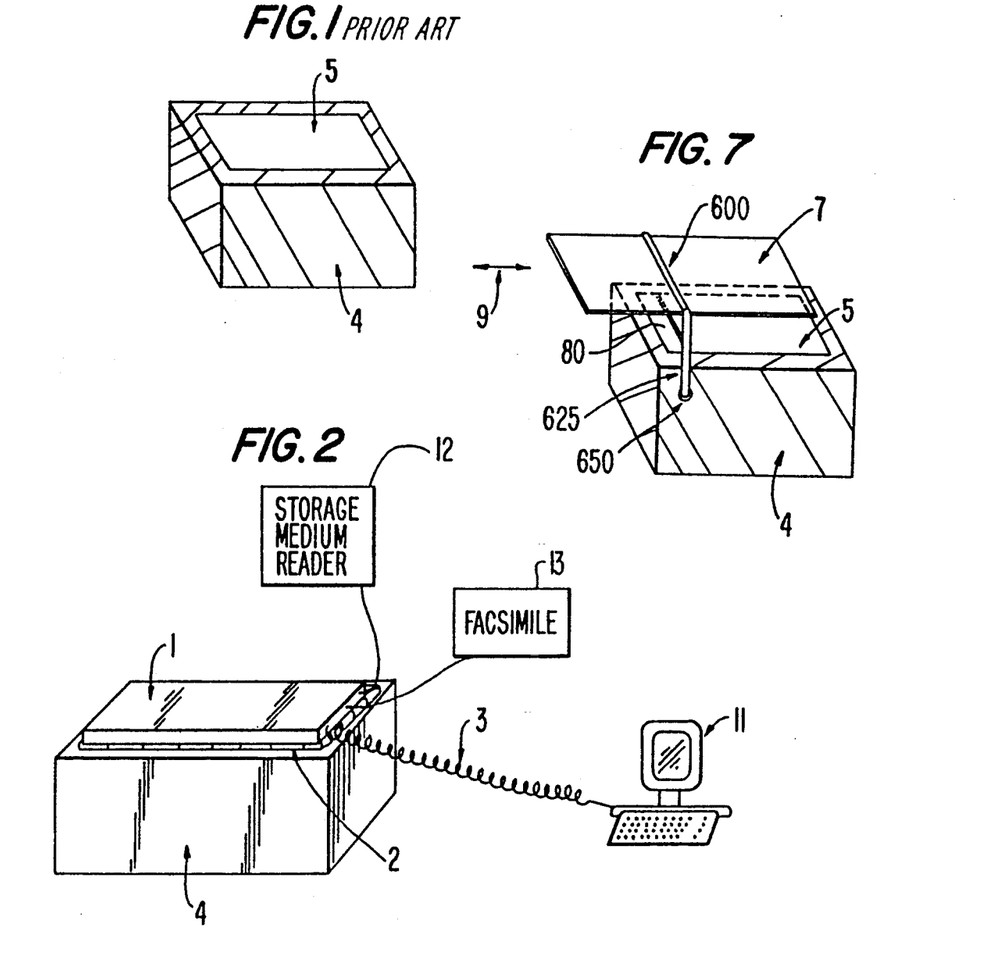
FIG. 1 illustrates a known copying apparatus in schematic form.
FIG. 2 depicts a preferred embodiment of the present invention mounted on top of the window of the copying apparatus illustrated in FIG. 1.
FIG. 7 illustrates an embodiment of the invention that can be used with copiers possessing moving copyboards, which are common to many low cost "personal" copiers.

Depicted in FIG. 1 is a representation of a known copying apparatus, such as a copier. The known copying apparatus includes a body 4 and a copier window 5. In one embodiment, the invention is in the form of an image-forming tablet. As shown in FIG. 2, the image-forming tablet 1 may be placed on top of a conventional copier like an ordinary document, with the copier window 5, shown in FIG. 1, immediately beneath the tablet 1. An electrical cable 3 may be used to convey the signal representative of the image to the tablet 1 from a signal source 11. As described above, the signal source 11 may include a variety of devices, such as a computer, a magnetic storage device, an optical storage device, etc. A light shield 2 may serve to reduce the leakage of ambient light through the copier window 5, and may be constructed of any suitable, compliant material.

Figure 3:
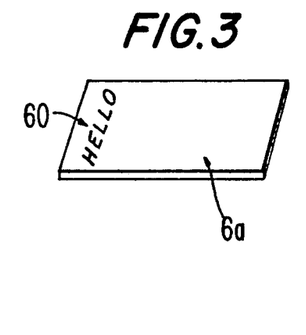
FIG. 3 illustrates a preferred embodiment of the image-forming components of the present invention.

An image forming element of the liquid crystal variety is pictured in FIG. 3. The liquid crystal image forming element includes a liquid crystal image forming layer 6a, capable of forming an image 60 (in this particular example, a set of alphabetical characters assembled into the word "Hello").

Figure 4:
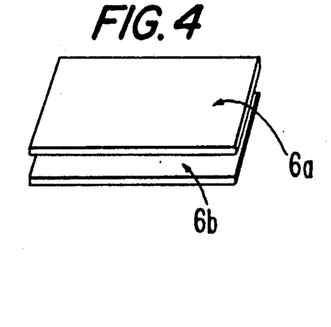
FIG. 4 illustrates a reflective layer that is disposed adjacent to or near the image-forming element of FIG. 3.

FIG. 4 illustrates a reflective back-layer 6b which may be provided adjacent to the liquid crystal image forming layer 6a. For purposes of clarity, the liquid crystal image forming layer 6a and the reflective back-layer 6b are depicted as being spatially separated by a significant distance in FIG. 4. However, in most embodiments of the invention these layers would be relatively closely disposed to each other.

The reflective back-layer 6b may be applied directly to the back surface of the liquid crystal image forming layer 6a in the form of a coating. A primary function of the reflective back-layer 6b is to provide an albedo in the non-imaged areas of the liquid crystal layer 6a that is optically distinct from the imaged areas of the liquid crystal layer. Non-imaged areas of the liquid crystal layer 6a are substantially optically transparent to radiation of wavelengths within the domain of concern. It is also possible to substitute for the reflective back-layer 6b an active, light emitting source, such as an electroluminescent panel. Back-lighting, however, increases the power consumption level.

Figure 5:
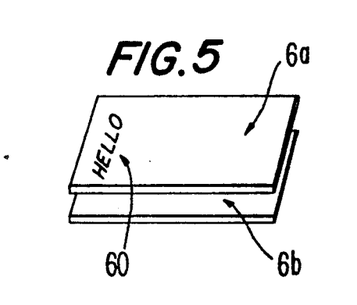
FIG. 5 illustrates the structures shown in FIG. 4 with an image present on the image-forming member (in this particular example, a set of alphabetical characters assembled into the word "Hello").

FIG. 5 depicts the elements of FIG. 4 with the inclusion of an alphabetic character string formed on the liquid crystal layer 6a.

Figure 6:
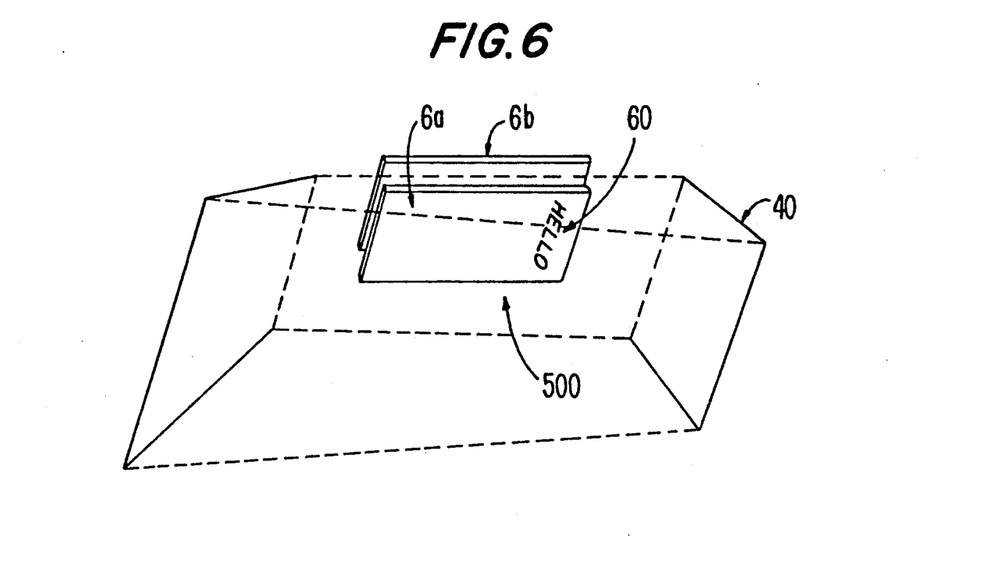
FIG. 6 is a perspective view from below the copier window of the structure in FIG. 5, when the illustrated embodiment of the present invention is mounted on the copy board of a copier.

FIG. 6 shows a schematic view from beneath the copier window 500 of an ordinary copying apparatus 40. The structures illustrated in FIG. 5 are shown positioned on top of the copier window 500, in the manner that they would be during the process of duplicating the image 60 formed by the image forming layer 6a.

The tablet shaped embodiment of the invention described above is fully capable of being used with low cost "personal" copiers possessing moving copy boards. An embodiment of the invention specially adapted for use with such copiers is illustrated in FIG. 7. As depicted in FIG. 7, the imaging element along with its supporting members is in the form of a strip 600. The strip 600 may be held in place by a structural support 625, which in turn may be mounted to the body of the copier 4 by a fastener 650. Beneath the copier window 5 can be seen that part of the copier 80 which is sensing the pattern formed by the strip 600 for reproduction onto a substrate. Interposed between the image forming element 600 and the copier window 5 is a transparent copy board 7 which is the part of the copying apparatus that undergoes translational motion, and is the member upon which any document to be copied is ordinarily placed.

FIG. 7 is intended to demonstrate one configuration of the present invention that may be used in conjunction with low cost "personal" copiers possessing moving copy boards. It will be recognized by those skilled in the art that numerous alternative configurations are possible for such use.

Figure 8:
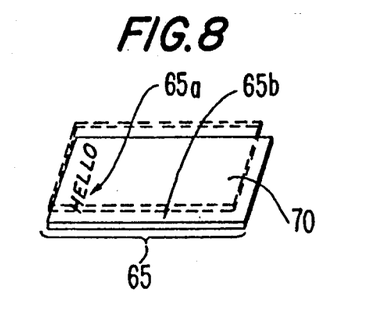
FIG. 8 illustrates an alternate embodiment to that depicted in FIG. 5 in which the image-forming element is of the emissive variety.

FIG. 8 illustrates an embodiment of the invention in which the image forming element is of the emissive variety; that is, of the type which emits radiation, e.g., light. Such an image forming element may, for example, employ a fluorescent display, a gas plasma display, etc. The image forming element 65, during the course of operation, may include one or more portions 65a that are not emitting light and one or more portions 65b that are emitting light. It is the sum of the non-light emitting areas 65b that collectively comprises the image to be printed.

In FIG. 8 the non-emitting areas 65a are seen to compose the character string "HELLO" against the background of emitting areas 65b. The photoconductor of a copier will be discharged by the light emitting portions 65b, to leave behind on the photoconductor a latent image charge pattern substantially identical to that defined by regions 65a. Also shown in FIG. 8 is an anti-reflective layer 70. The function of this anti-reflective layer is to reduce the amount of light emanating from the copier's internal light source that is back-reflected off of the surface of the image forming member of the apparatus of the present invention. In practice the anti-reflective layer is more likely to be present as a surface coating on the image forming member. An anti-reflective layer may be included in other embodiments, such as those employing liquid crystal components.

Figure 9:
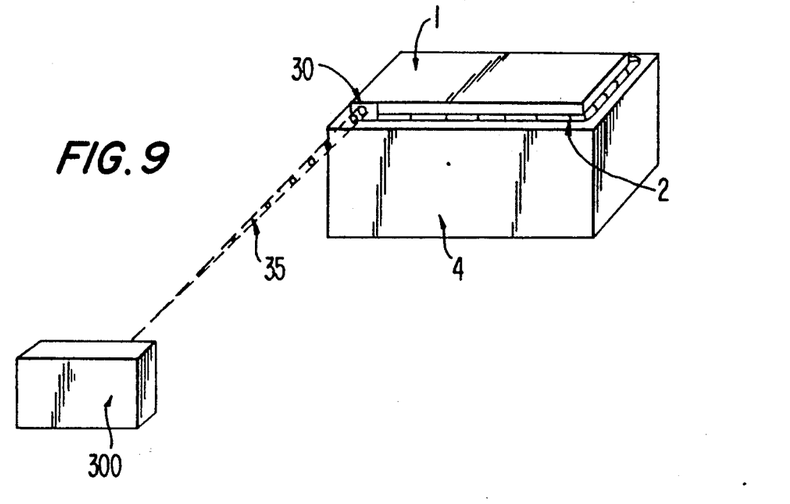
FIG. 9 illustrates an embodiment of the invention in which the signal representative of the image to be printed is transmitted to the image-forming member by an "intangible mechanism" such as an infra-red beam, rf-signal, etc. (in contrast to a cable or electrical wire).

FIG. 9 is a diagrammatic representation of an arrangement where the electrical signals defining the image to be printed are transmitted by an infrared beam, rf-carrier, or other "intangible medium" from a source 300 to the apparatus of the present invention 1. The point of reception of the information-bearing signal is shown as 30. The "intangible medium" that substitutes for the electrical cable or connector is indicated by 35. The copying apparatus is designated as 4; and the webbing which shields ambient light from leaking through the tablet/copier interface is identified as 2.

Figure 11:
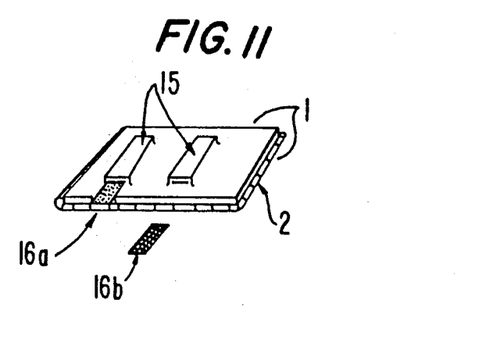
FIG. 11 illustrates an installation of two different and optional Device Emulation Modules, which impart to the apparatus additional capabilities such as facsimile machine emulation.

FIG. 11 illustrates the installation of two Device Emulation Modules into "Module Bays", 15. In FIG. 11, a first module, 16a, is designed to perform a first function, and a second module, 16b, designed to perform a second, different function. An example of a function which a module 16a or 16b may perform is that of facsimile machine emulation, as described in further detail below. Whereas two Modules are shown in FIG. 11, the apparatus of the present invention is not restricted to this number. Also, while some embodiments contain data storage devices such as disk drives, these are not represented in FIG. 11.

Some embodiments incorporate into the apparatus the means to read directly from data storage media such as magnetic diskettes, magnetic tapes, or optical discs. This facility permits text or graphical information to be directly loaded into the apparatus and obviates the need for connection to another device such as a computer. As some embodiments of the invention may be powered by batteries, certain versions, especially when coupled with the capability to read directly from data storage media are highly self-contained and portable: requiring for operation only a conventional copier and a diskette (for instance) containing material to be printed.

An embodiment specially adapted for "forms printing" includes a modification to the spacing between image forming element 6a and reflective back-layer 6b (which were discussed earlier in connection with FIGS. 4 through 6).

Figure 12:
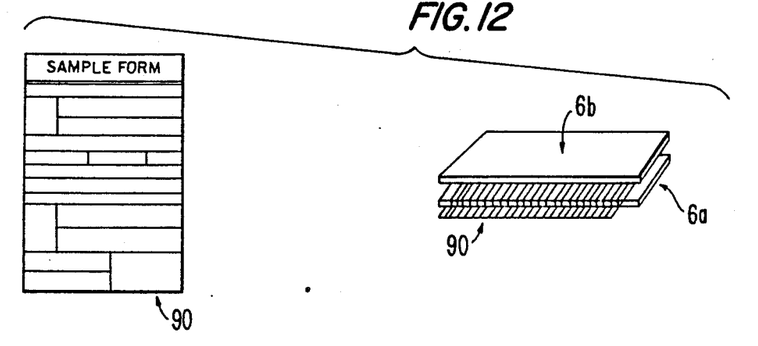
FIG. 12 illustrates an embodiment specially adapted for "forms handling"—that is, the computer assisted completion of forms, wherein a form (or application) is being inserted between an image forming element and a reflective back-layer.

As illustrated in FIG. 12, a blank form 90 is inserted between members 6a and 6b, with the front of the blank form facing 6a. The actual spacing between members 6a and 6b may be changeable so as to accommodate forms of different thicknesses; and means may be provided to adjust the spacing to suit the inserted form. Additional means may be provided to alter the relative positions of layers 6a and 6b to facilitate insertion and removal of blank forms, as well as to insure their proper alignment within the tablet.

Figure 13:
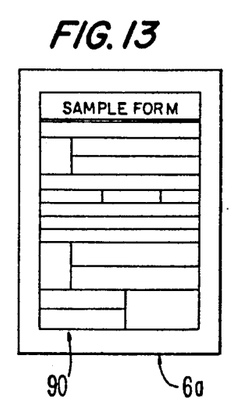
FIG. 13 is a view of a "blank form" as seen through the image forming member.
Figure 14:
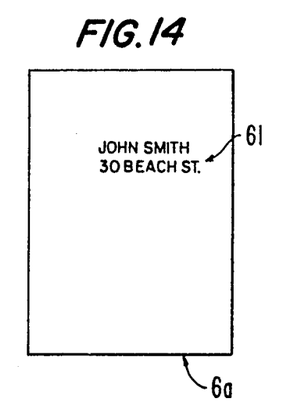
FIG. 14 illustrates an image forming member bearing information pertinent to completion of the "blank form" generated on it.
Figure 15:
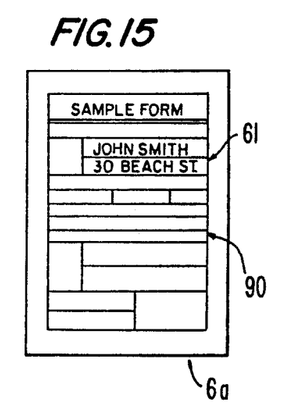
FIG. 15 depicts the information appearing in FIG. 14 superimposed on the "blank form".

FIG. 13 demonstrates how blank form 90 would appear viewed through image forming member 6a, which is the copier's perspective during the reproduction process. FIG. 14 depicts the image forming member, 6a, with alphanumeric information, 61, generated on it. In the illustrated example, the information comprises two data fields that are pertinent to completion of blank form 90: a name, and a street address. The information may be derived from a software package such as a data base manager, a spreadsheet, or a word processor. FIG. 15 portrays the visual overlay that results when blank form 90 is situated behind image forming member 6a, and displayable information is present on member 6a.

Figure 16:
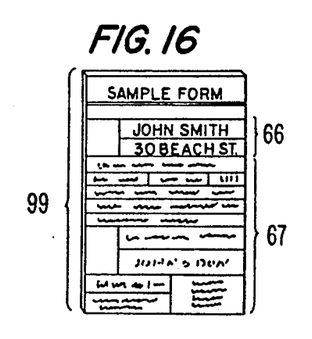
FIG. 16 shows a "completed form" that was created by the apparatus of an embodiment of the present invention.

Exhibited in FIG. 16 is the printed output of a copier that has been used in combination with the tablet of an embodiment of the present invention operating in "forms printing" mode. It can be seen that the original blank form, 90, has been duplicated and that the data discussed in connection with FIGS. 14 and 15 have been imprinted on the replica; they are indicated by 66. Other information, 67, relevant to the completion of blank form 90 has, in a similar manner, likewise been imprinted. The "filled out form" output by the copier is labelled 99.

In addition to serving as a portable conversion device that enables a conventional copier to function as an electronic printer, high speed printing matching and even exceeding the capability of dedicated electronic printers can be achieved by using the present invention in concert with high performance copying equipment. Further, other benefits provided by such equipment including large volume printing, and elaborate paper handling facilities like collation and stapling can be conveniently tapped.

Not only do embodiments of the present invention permit an ordinary copier to be utilized as a computer printer, but it also enables the conventional copier to function as a "receiving end" facsimile printer. In one embodiment a facsimile module can be plugged into the tablet to enable fax data transmitted over standard telephone lines to be intercepted, interpreted, and converted into displayable form. Once present on the image forming member, the graphical data can be reproduced by a copier. Further, it should be noted that the facsimile information can be directly viewed off of the image forming member, and thus need not be printed unless desired. In this manner the present invention provides for both "optical fax" and conventional "hardcopy fax", and permits the user to inspect a transmitted document in entirety before deciding whether all or only portions are to be printed. Variations on this theme include embodiments possessing document scanning capabilities, so that data transmission is possible, in addition to data reception. Other embodiments are equipped with storage means so that incoming data can be saved, then printed in a time-shifted fashion at another moment.

Figure 10:
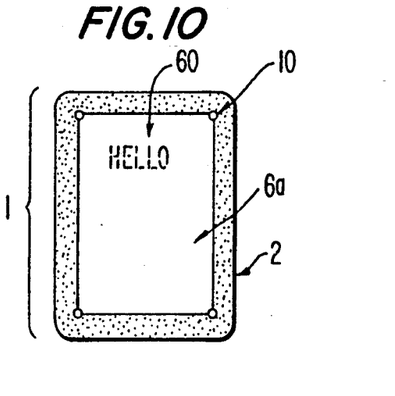
FIG. 10 illustrates one possible arrangement of photodetectors on an image forming tablet.

Embodiments of the invention may possess means to detect when a copier has completed its scan cycle; that is, when an image to be duplicated has been successfully captured by the copier. An example of a detection means is a photosensor 10 shown in FIG. 10. Shortly after the photosensor 10 detects the flash from the copier's source of illumination, the next image, or page, is formed on the image forming member. With the next image present, the succeeding copy cycle prints the next page of information. Multiple copies of each page are handled by counting the number of flashes emanating from the copier; when the count reaches the number of copies desired for that page, the next page is formed on the image forming member. The copier must be set to the total number of pages that are to be printed.

In practice it is convenient to employ four photodetectors positioned approximately at the corners of the image forming tablet. After all four photodetectors register exposure to the copier's source of illumination, "page flipping" on the image forming member takes place. "Page flipping" does not take place if all of the photodetectors do not register an exposure, since such a situation may be the result of an error condition: for example, the page on the image forming member may not have been completely scanned by the copier. As would be clear to individuals skilled in the art of circuit design, the above-described operation is easily accomplished by simple logic circuitry; which is preferably incorporated into the tablet of the present invention. The method described for controlling "page flipping" applies to copiers with scanning light sources and copiers with flash type light sources with equal facility. Manual "page flipping" is also possible, but requires the sustained presence of an operator. Furthermore, it will be recognized that other types of detection means for detecting when a copying operation is being, or has been, performed may be employed (e.g., thermal sensors, current or voltage sensors, etc.).

While the placement of an image forming element of one of the kinds described herein within an otherwise typical, dedicated copying tablet is possible, it has not been the objective here to propose device modifications. In contrast, the goal of the present invention is to make use of existing conventional, dedicated copying equipment to print images created or stored in an electronic format that heretofore has necessitated the use of an tablet such as a "computer printer".

As used herein the term "sensor" refers to a device that performs the function of sensing or determining whether a copying operation has taken place. As used herein the term "sensor" also refers to those device elements which, acting alone or in combination with other elements, contribute to a tablet's ability to determine whether a copying operation has been successfully executed.

Embodiments of the present invention may employ a plurality of sensors to monitor copy execution at a plurality of positions within the duplication field of a copier. Embodiments of the present invention may also employ arrangements wherein a multi-sensor array comprises a set of sub-components. The sub-components may include, for example, a plurality of receptors connected by a plurality of conductors to one or more detectors. The receptors may comprise lenses, the conductors may comprise optical fibers, and the detectors may comprise photodetectors. Some examples of such additional configurations are further explained in conjunction with FIGS. 17 and 18.

Figure 17A:
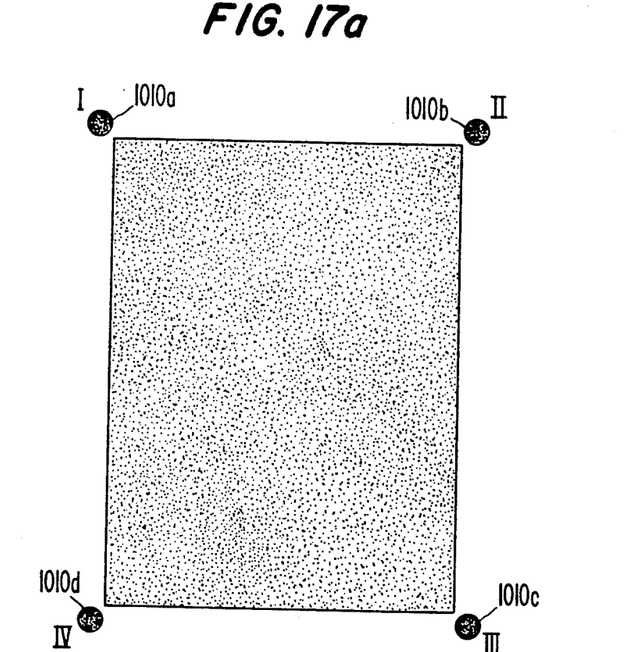
FIGS. 17a-b illustrates an embodiment of the present invention in which a plurality of copy detection sensors are included in a tablet.
Figure 17B:
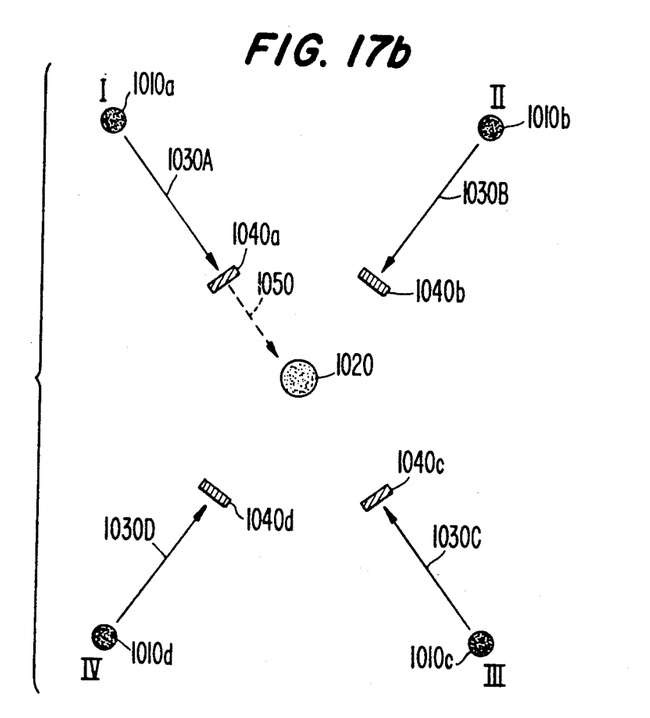

FIGS. 17a-b illustrate an embodiment of the present invention in which a plurality of copy detection sensors are included in the tablet. In the illustrated example, the multiple sensors comprise a number of sub-components. Those sub-components include: a plurality of lenses 1010a-d which act as receptors for copier light, a photodetector 1020 for detecting light gathered by the receptor lenses 1010a-d, a plurality of optical fibers 1030a-d for conducting light gathered by the receptor lenses 1010a-d to the photodetector 1020, and a plurality of light valves 1040a-d for regulating the passage or non-passage of light conducted through the optical fibers 1030 from the receptor lenses 1010 to the photodetector 1020.

The light valves 1040 may comprise liquid crystal light shutters or any of the numerous other devices currently available for regulating the passage or non-passage of light. In the example illustrated in FIG. 17b, the light valve 1040a is depicted in the conducting state, allowing light 1050 to pass onward to the photodetector 1020. In the example illustrated in FIG. 17b, the light valves 1040b-d are depicted in the non-conducting state. Timing and logic circuitry for controlling the sequential openings and closing of the light valves 1040 may be included.

The receptor lenses 1010 may be located at any of a number of different positions on the tablet. In practice, it may be convenient to place the receptor lenses at the four corners of the tablet, corresponding to the four corners of the page that appears on the image forming screen. When so positioned, the receptor lenses 1010 will "bracket" a graphic image generated on the image forming screen, thereby offering a means to protect against erroneous print conditions (such as, for example, portions of the document page not being properly captured by the copier). Having a plurality of sensors also enhances the universality of the tablet and enables features such as "auto-deskewing", which is described in a co-pending patent application.

In the embodiment illustrated in FIG. 17b, the optical fibers 1030 conduct light gathered by each of the receptor lenses 1010 to the corresponding light valves 1040. The light valves 1040 function to regulate the passage of light from the optical fibers 1030 to the photodetector 1020. Each of the light valves 1040 is in a "closed" or blocking state until it is switched into an "open" or passing state by control circuitry (not illustrated). Therefore, any light gathered by a receptor lens 1010 and conducted through an optical fiber 1030 will not reach the photodetector 1020 as long as the light valve 1040 is in a "closed" state.

Each of the light valves 1040 may be sequentially switched into an "open" state for a predetermined interval. If any given light valve 1040 is in an "open" state, then the photodetector 1020 will detect light exclusively from the corresponding receptor lens 1010 situated at the other end of the optical fiber 1030 having the "open" light valve. By opening and closing the light valves 1040 in sequence, to thereby cycle through each of the plurality of receptor lenses 1010, the photodetector 1020 is able to detect the presence or absence of copier light at each of the receptor lens positions. The cycle period is preferably substantially less than one second. Copying of subsequent pages may be prevented until copy detection is confirmed at each of the receptor lens positions.

In some cases, multiple cycles may be required. In such instances, subsequent cycles "look out" for the detection of copier light in receptor lens positions where no copier light was detected in previous cycles. Detected positions may thus be accumulated until all receptor lens positions have been registered as detecting copier light. This accumulation may be accomplished by simple logic circuitry or, alternatively, if the tablet contains a microprocessor, this accumulation may be handled by way of a pre-programmed interrupt to a CPU which would increment and maintain a tally.

The embodiment of the invention illustrated in FIGS. 17a-b may also be used to monitor error conditions. For example, if copy light detection is initially confirmed at several receptor lens positions, and then reconfirmed for those same those positions, while not confirmed at the remaining positions, this may be interpreted as a miscopy condition. In response to detection of a miscopy condition, copying of subsequent pages may be halted and the tablet may issue a warning, such as an audible tone, to alert the operator to the miscopy condition.

The embodiment of the invention illustrated in FIGS. 17a-b may also include a means to prolong the intensity and/or the duration of effective copier light exposure at the receptor lens positions. For example, phosphorescent material may be added to the structure of the receptor lenses 1010. The photodetector 1020 may therefore detect light from either the copier light source, or the phosphorescent material, or both. The phosphorescent material may be selected so that the wavelength and/or the duration of the phosphorescence is precisely defined and controlled. This allows the optical characteristics of the invention to be precisely tuned. For example, the photodetector 1020 need not be sensitive to the wavelength of light generated by a particular copier light source. Selection of the appropriate phosphorescent material permits the photodetector 102 to detect light from the phosphorescent material at a wavelength to which the photodetector is maximally sensitive. Selection of the appropriate phosphorescent material also allows the duration of exposure of a sensor to be extended, in a controllable fashion, beyond the actual duration of exposure to the copier light source.

As an alternative to phosphorescent material, some embodiments of the invention may employ charge coupled devices or other elements in which charged states, or other persistent, altered states, are formed in response to copier light exposure. These persistent, altered states may then be sequentially sampled at each of the receptor positions by one or more detectors, in accordance with the techniques described above, to determine whether exposure occurred at each of the receptor positions.

Figure 18A:
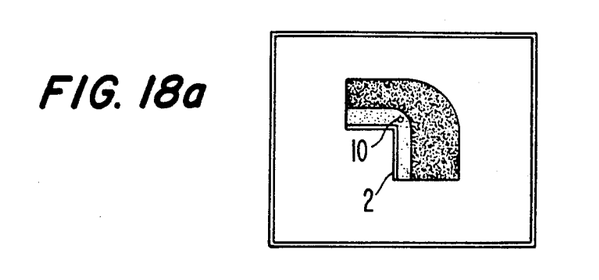
FIG. 18a-c illustrates an alternative embodiment of the invention employing multiple sensors.
Figure 18B:
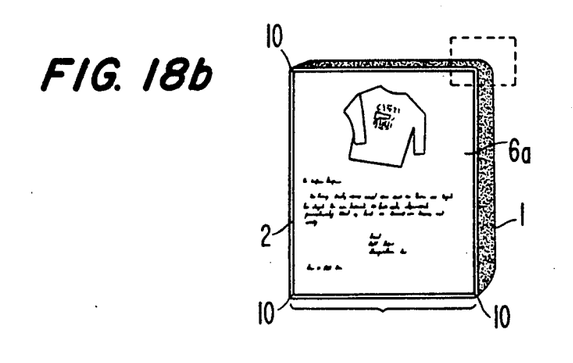
Figure 18C:
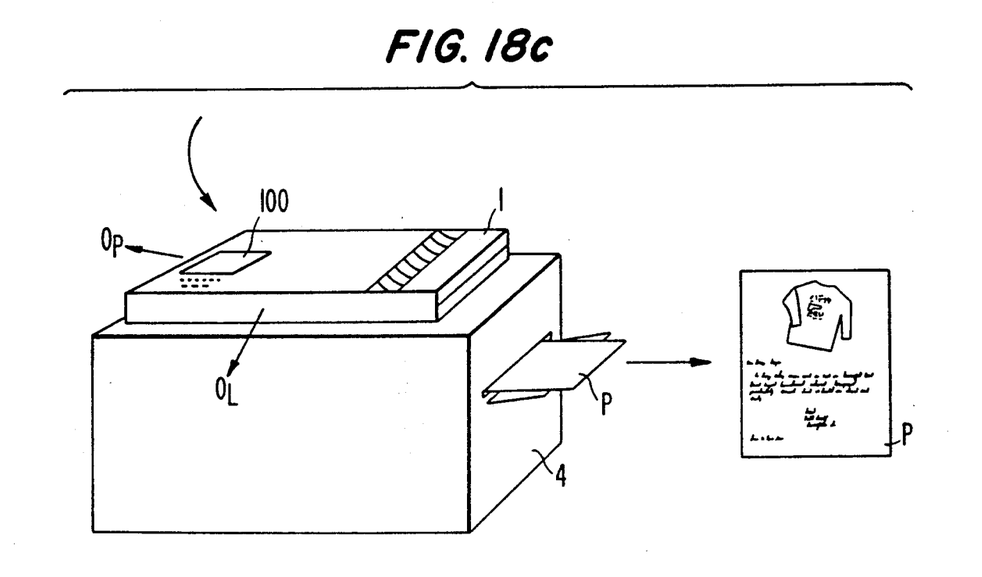

FIGS. 18a-c illustrate an alternative embodiment of the invention employing multiple sensors. FIG. 18b illustrates an example of the image display screen 6a of the tablet 1. A plurality of sensors 10 for detecting the occurrence of a copying operation are located at the corners of the image display screen 6a. A light gasket 2 is positioned around the perimeter of the image display screen 6a. The light gasket 2 may be constructed of any suitable, flexible material (e.g., rubber).

In the illustrated embodiment, only one of the plurality of sensors 10 is activated at any given moment. The remaining, inactivated sensors do not provide information to the tablet with respect to the copy operation.

An operator's console 100 provides the operator with a list of copying equipment currently available. The list may be stored in ROM included in the tablet. The console 100 may also include a touch-sensitive screen for inputting data. A user may select, from among the listed choices of copying equipment appearing on the screen, the manufacturer and model number of the particular copier being used. After a selection has been made, one of the plurality of sensors 10 is activated by the tablet to perform copy detection. The remaining sensors are maintained in an off state and do not provide information to the tablet with respect to the copy operation. If the particular copier being used employs a scanning light source, then the activated sensor is preferably the sensor located on the trailing edge of the tablet.

In the illustrated embodiment, there are two preferred orientations for placing the tablet on top of a copier. As shown in FIG. 18c, the orientation O(L) is preferred with copying equipment requiring documents to be placed in a "landscape orientation"Orientation O(P) is preferred with copiers requiring documents to be placed in a "portrait orientation". Information as to which of the two orientations is appropriate for the particular copier being used is usually furnished by the copier in the form of placement markers appearing on the perimeter of the copy table. Having identified the particular copier being used, and having properly placed the tablet onto the copier window, hardcopy document P may be produced in accordance with this embodiment of the invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A device for presenting a plurality of images to a copier to enable reproduction of the plurality of images by the copier, the copier being capable of performing a copying operation and defining a copier light source, a copier window and a copier duplication field, the device comprising:

display means for displaying a plurality of images through the copier window, sensing means for sensing the occurrence of a copying operation performed by the copier at a plurality of sensing positions within the copier duplication field, and control means, responsive to the sensing means, for controlling the display means to display a first image prior to the sensing of a copying operation and to display a second image following the sensing of a copying operation at each of the plurality of sensing positions within the copier duplication field, the sensing means comprising a plurality of copy detection sensors, at least one of the copy detection sensors comprising:

receptor means for receiving light from the copier light source, detection means for detecting light received by the receptor means, conduction means for conducting light from the receptor means to the detection means, and valve means for regulating the conduction of light through the conduction means.

2. The device according to claim 1 wherein the receptor means comprises a lens.

3. The device according to claim 1 wherein the detection means comprises a photodetector.

4. The device according to claim 1 wherein the conduction means comprises an optical fiber.

5. The device according to claim 1 wherein the valve means comprises a liquid crystal light shutter.

6. The device according to claim 1 wherein the valve means defines a light blocking state and a light passing state, and wherein light received by the receptor means and conducted through the conduction means does not reach the detection means when the valve means is in the light blocking state.

7. The device according to claim 1 wherein light from the copier light source defines an intensity and a duration and comprising means for prolonging at least one of the intensity and the duration of the light from the copier light source at at least one of the sensing positions.

8. The device according to claim 7 wherein the means for prolonging comprises phosphorescent material associated with the receptor means.

9. The device according to claim 6 comprising a plurality of receptor means and a corresponding plurality of valve means, wherein each of the plurality of valve means is sequentially switched into a light passing state for a predetermined interval, whereby the detection means detects light received by each of the plurality of receptor means in sequence.

* * * * *